United States Patent
Cheng et al.

(10) Patent No.: US 10,740,916 B2
(45) Date of Patent: Aug. 11, 2020

(54) METHOD AND DEVICE FOR IMPROVING EFFICIENCY OF RECONSTRUCTING THREE-DIMENSIONAL MODEL

(71) Applicant: Quanta Computer Inc., Taoyuan (TW)

(72) Inventors: Kai-Ju Cheng, Taoyuan (TW);
Yu-Cheng Chien, Taoyuan (TW);
Yi-Ling Chen, Taoyuan (TW);
Kuan-Chung Chen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/211,354

(22) Filed: Dec. 6, 2018

(65) Prior Publication Data

US 2019/0355137 A1 Nov. 21, 2019

(30) Foreign Application Priority Data

May 18, 2018 (TW) .............................. 107116987 A

(51) Int. Cl.
*G06T 7/521* (2017.01)

(52) U.S. Cl.
CPC .......... *G06T 7/521* (2017.01); *G06T 2200/08* (2013.01); *G06T 2207/10028* (2013.01)

(58) Field of Classification Search
CPC ................................. G06F 1/324; G06T 7/521
See application file for complete search history.

(56) References Cited

U.S. PATENT DOCUMENTS

2014/0028801 A1* 1/2014 Tin .......................... G01N 21/55
348/46

2015/0136949 A1* 5/2015 De Nooij ............. G02B 21/082
250/208.1

FOREIGN PATENT DOCUMENTS

CN 1271143 A 10/2000
CN 101975558 A 2/2011

OTHER PUBLICATIONS

TIPO Office Action dated Jun. 28, 2019 for TW Application No. 107116987, pp. 1-4.
Search Report dated Jun. 28, 2019 for TW Application No. 107116987, pp. 1.

* cited by examiner

*Primary Examiner* — Brian T Pendleton
*Assistant Examiner* — Kyle M Lotfi
(74) *Attorney, Agent, or Firm* — McClure, Qualey & Rodack, LLP

(57) ABSTRACT

A method for improving the efficiency of reconstructing a three-dimensional model is provided. The method includes: dividing a series of different Gray code binary illumination patterns into a plurality of groups; converting binary values of Gray code binary illumination patterns in each group to a plurality of sets of two specific values to generate decimal illumination patterns corresponding to the specific values; overlapping the decimal illumination patterns in each group to a grayscale illumination pattern; using a projector to project each grayscale illumination pattern onto an object from a projection direction; using a camera to capture one or more object images of the object; reverting the object images to non-overlapping Gray code binary images corresponding to the object images; and reconstructing the depth of the object according to the non-overlapping Gray code binary images.

10 Claims, 9 Drawing Sheets

| Decimal value | Gray code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

FIG. 2A

METHOD AND DEVICE FOR IMPROVING EFFICIENCY OF RECONSTRUCTING THREE-DIMENSIONAL MODEL

CROSS REFERENCE TO RELATED APPLICATIONS

This application claims priority of Taiwan Patent Application No. 107116987, filed on May 18, 2018, the disclosure of which is incorporated by reference herein in its entirety.

BACKGROUND OF THE INVENTION

Field of the Invention

The present disclosure relates to the reconstruction of three-dimensional models. Specifically, the present disclosure relates to a method and device for improving the efficiency of reconstructing a three-dimensional model.

Description of the Related Art

Three-dimensional profilometry uses profile measuring technology that includes methods of grayscale coding. Existing grayscale coding methods first project different grayscale stripes by projecting stripe light and then to capture images so that each pixel has a unique grayscale code. However, a considerable number of grayscale stripe images need to be projected in order to improve the accuracy of the grayscale coding methods. Therefore, the grayscale coding methods are quite time-consuming.

Therefore, there is a need for a method and device for improving the efficiency of reconstructing a three-dimensional model to reduce the number of projected grayscale stripe images and improve efficiency.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and device for improving the efficiency of reconstructing a three-dimensional model are provided.

In a preferred embodiment, a method for improving the efficiency of reconstructing a three-dimensional model is provided in the disclosure. The method includes the following steps: dividing a series of different Gray code binary illumination patterns into a plurality of groups; converting binary values of Gray code binary illumination patterns in each group to a plurality of sets of two specific values to generate decimal illumination patterns corresponding to the specific values; overlapping the decimal illumination patterns in each group to a grayscale illumination pattern; using a projector to project each grayscale illumination pattern onto an object from a projection direction; using a camera to capture one or more object images of the object; reverting the object images to non-overlapping Gray code binary images corresponding to the object images; and reconstructing the depth of the object according to the non-overlapping Gray code binary images.

In some embodiments, the plurality of sets of two specific values satisfy the following conditions: one of two specific values in each set is added to produce sums of different combinations, wherein the sums of the different combinations are different from each other; and a maximum sum obtained by adding the maximum specific value of two specific values in each set is less than a grayscale value resolution of the camera.

In some embodiments, the number of sets of two specific values is equal to the number of Gray code binary illumination patterns in each group.

In some embodiments, when the number of sets is two, the specific values of the sets are (0 and 50) and (100 and 200).

In some embodiments, when the number of sets is three, the specific values of the sets are (0 and 512), (64 and 1088) and (192 and 2240).

In a preferred embodiment, a device for improving the efficiency of reconstructing a three-dimensional model is provided in the disclosure. The device comprises a processor and a memory operatively coupled to the processor. The processor is configured to execute a program code stored in the memory to: divide a series of different Gray code binary illumination patterns into a plurality of groups; convert binary values of Gray code binary illumination patterns in each group to a plurality of sets of two specific values to generate decimal illumination patterns corresponding to the specific values; overlap the decimal illumination patterns in each group to a grayscale illumination pattern; use a projector to project each grayscale illumination pattern onto an object from a projection direction; use a camera to capture one or more object images of the object; revert the object images to non-overlapping Gray code binary images corresponding to the object images; and reconstruct the depth of the object according to the non-overlapping Gray code binary images.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

FIG. 2A is a table showing decimal values together with 4-bit Gray codes.

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Figure 1:
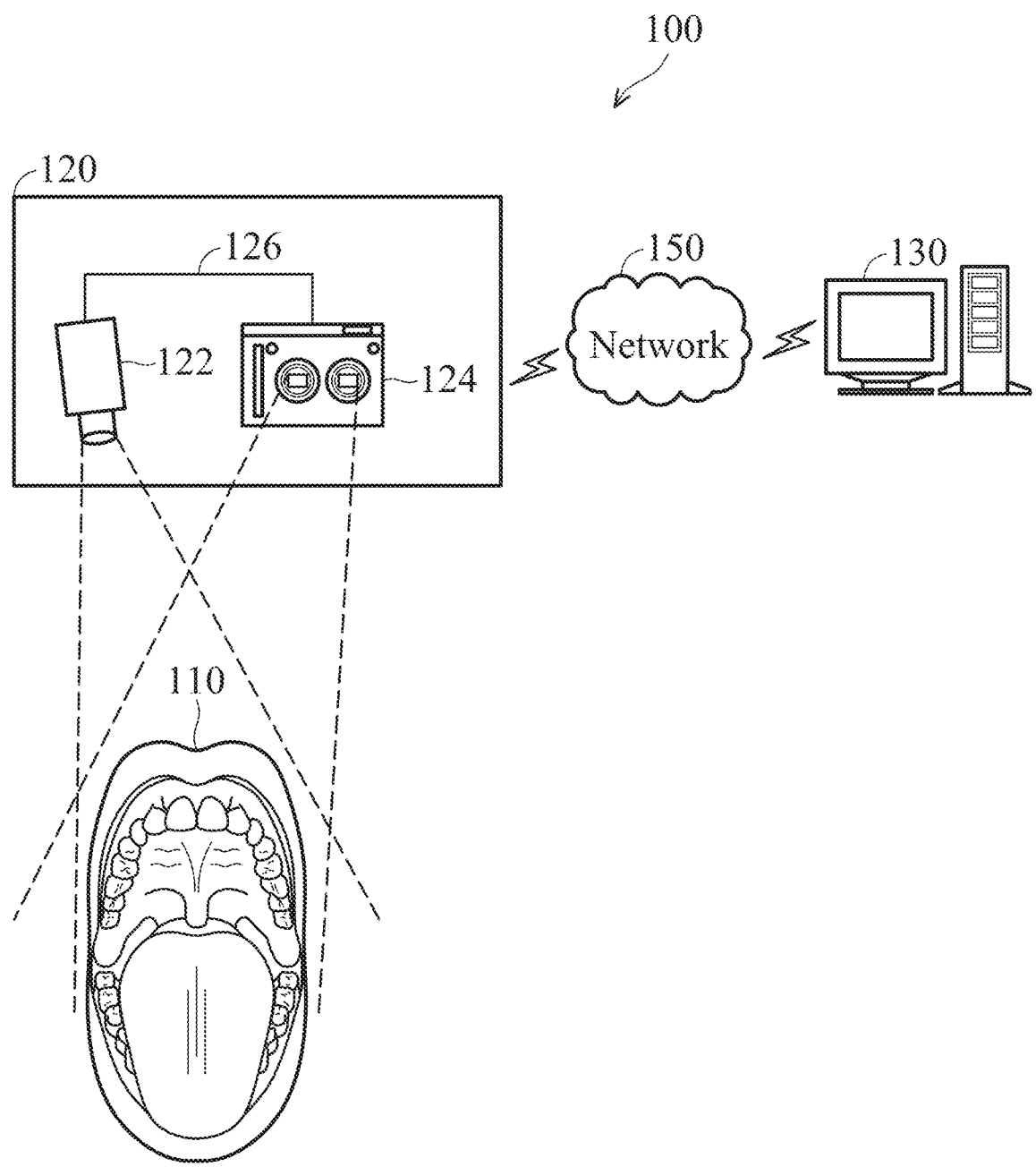
FIG. 1 shows a system configured to illuminate an object with structured light and subsequently capture and process structured light reflected by the object in accordance with an embodiment of the present disclosure.

FIG. 1 shows a system 100 configured to illuminate an object 110 with structured light and subsequently capture and process structured light reflected by the object 110 in accordance with an embodiment of the present disclosure. The object 110 can be any three-dimensional (3D) item, such a person's face or oral cavity, an inanimate structure or other item of interest which can be brought within the field of view of the system 100.

The system 100 includes a computing device 130 and an illumination/capture device 120. The computing device 130 can be connected to the illumination/capture device 120 using the network 150. The network 150 may also include a local area network (LAN) (e.g., an intranet), a wireless local area network (WLAN) or a Wi-Fi network, a third generation (3G) or a fourth generation (4G) mobile telecommunications network, a wide area network (WAN), the Internet, Bluetooth, or any suitable combination thereof.

In the embodiment shown, the computing device 130 is shown to be separate from the illumination/capture device 120, but physically connected thereto by a cable (not shown in FIG. 1). In other embodiments, however, the computing device 130 and the illumination/capture device 120 can be integrated into a unitary housing or single piece.

The illumination/capture device 120 at least comprises a light projector 122 and a camera 124. A bus 126 is electrically connected to the light projector 122 and the camera 124. Furthermore, in the present disclosure, the relative positions of the light projector 122 and the camera 124 are known to the computing device 130.

The light projector 122 is capable of projecting a two-dimensional image. In one embodiment, the light projector 122 is a commercial off-the-shelf digital light projector (DLP) or other light projector employing one or more of a variety of technologies capable of displaying the desired pattern. Thus, in the present disclosure, the term "light projector" is intended to cover projection devices employing DLP, LEDs, fiber optic systems, laser illumination and even slide projectors.

The camera 124 may be any device or apparatus which is capable of capturing light reflected by the object 110 of interest, for example, a camera with two lenses, a camera that has a single lens and can take two successive photographs, and the like. In one embodiment, the camera 124 has a CCD array, a CMOS array, or the like, which is configured to capture an image along a corresponding focal plane. It should be understood, however, that other digital cameras may be used instead.

The computing device 130 can create a two-dimensional illumination pattern projected by the light projector 122 onto the object 110 and process the captured image transmitted by the camera 124 to perform reconstruction of the three-dimensional model of the object 110. In an embodiment, the two-dimensional illumination pattern is a structured light pattern.

Specifically, to create an illumination pattern, the computing device 130 merely needs to generate a single line of pixel values, and then replicate this single line in the vertical dimension. In one embodiment, the illumination pattern can be stored in the memory of computing device 130. The two-dimensional illumination pattern stored in the memory can be transmitted to the light projector 122 that projects light onto the object 110.

In some embodiments, for each illumination pattern, the processor in the computing device 130 can be programmed to create a single line of pixels, and then replicate this line before storing the pattern in memory. In other embodiments, illumination patterns can be created beforehand and stored in the memory of the computing device 130, and so the computing device 130 is not used to create any illumination patterns.

Figure 2B:
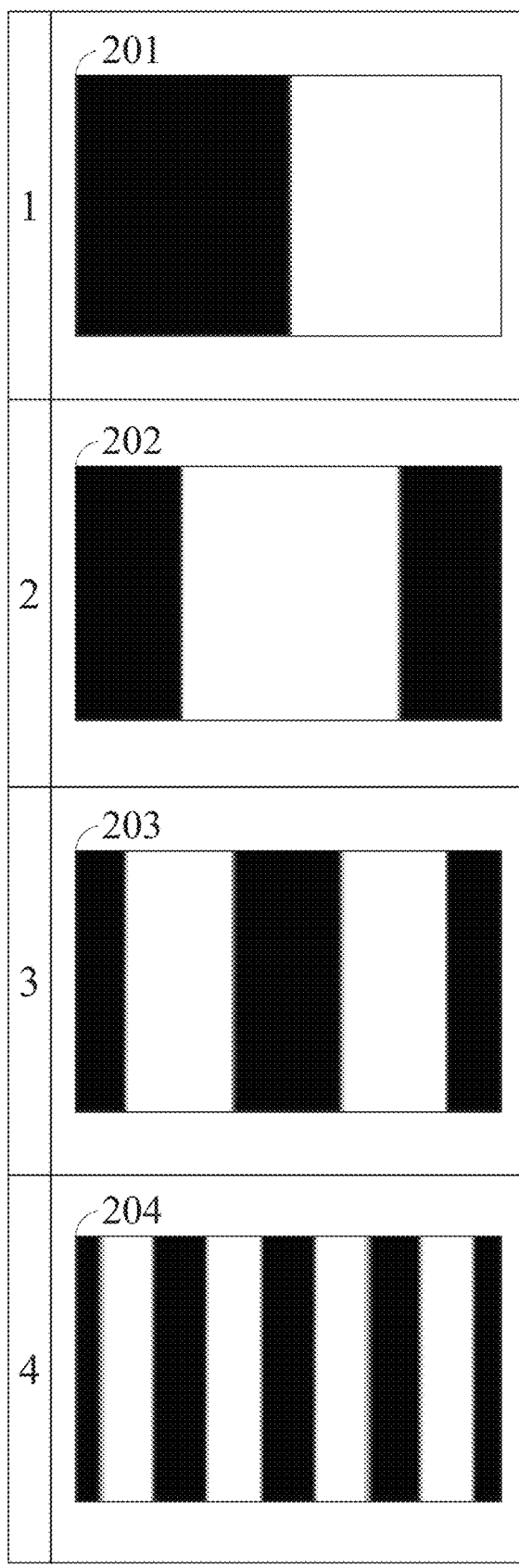
FIG. 2B shows an example of 4-bit Gray code binary illumination patterns.

In some embodiments, the illumination pattern is generated based on a Gray code. FIG. 2A is a table showing decimal values together with 4-bit Gray codes. FIG. 2B shows an example of 4-bit Gray code binary illumination patterns. As shown in FIGS. 2A~2B, Gray code is advantageous over other binary codes, such as the natural binary code, because adjacent Gray codes differ only in one bit. In the event a recovery error occurs when dealing with the Gray code, it is likely that the error will be limited to only one bit. In other words, the 3D reconstruction error tends to be lower with the Gray code.

In Gray code, it has been considered that when capturing an object projected and illuminated with a Gray code binary illumination patterns, the object is captured by a monochrome (e.g., grayscale) camera. Analysis of the captured images then recovers the Gray code at each image point.

Figure 3:
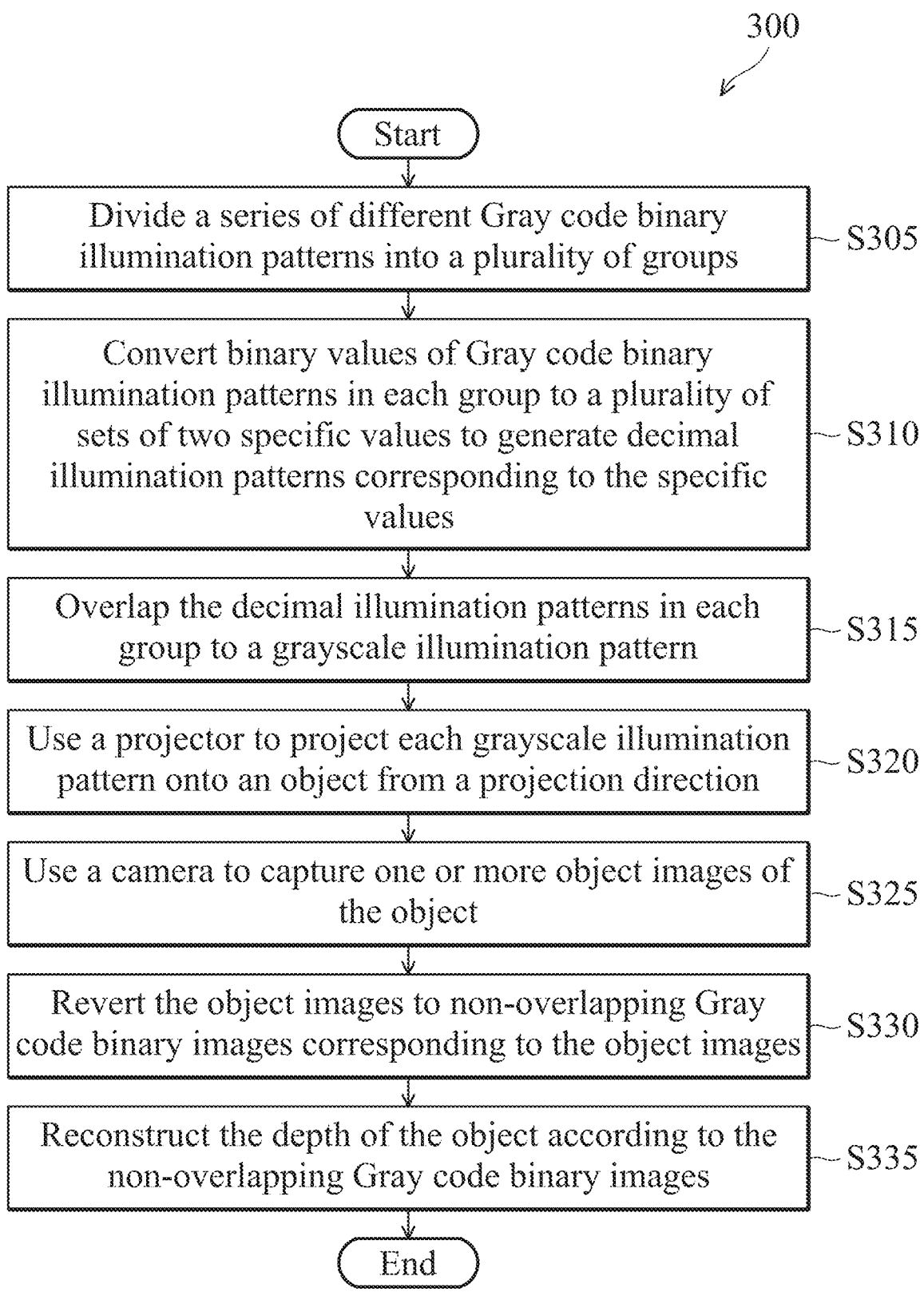
FIG. 3 is a flow diagram illustrating a method for improving the efficiency of reconstructing a three-dimensional model according to an embodiment of the present disclosure.

FIG. 3 is a flow diagram 300 illustrating a method for improving the efficiency of reconstructing a three-dimensional model according to an embodiment of the present disclosure. The method is used in the processor of the computing device 130 of FIG. 1.

In step S305, the computing device divides a series of different Gray code binary illumination patterns into a plurality of groups. In step S310, the computing device converts binary values of Gray code binary illumination patterns in each group to a plurality of sets of two specific values to generate decimal illumination patterns corresponding to the specific values, wherein the number of sets of two specific values is equal to the number of Gray code binary illumination patterns in each group. For example, the computing device may randomly select two Gray code binary illumination patterns as a group, and the computing device converts the binary values of the two Gray code binary illumination patterns in each group into two sets of two specific values, respectively. In another example, the computing device can randomly select three Gray code binary illumination patterns as a group, and the computing device converts the binary values of the three Gray code binary illumination patterns in each group into three sets of two specific values, respectively.

In step S315, the computing device overlaps the decimal illumination patterns in each group to a grayscale illumination pattern. Then, in step S320, the computing device uses a projector to project each grayscale illumination pattern onto an object from a projection direction. In step S325, the computing device uses a camera to capture one or more object images of the object. Next, in step S330, the computing device reverts the object images to non-overlapping Gray code binary images corresponding to the object images. In step S335, the computing device reconstructs the depth of the object according to the non-overlapping Gray code binary images.

In an embodiment, the plurality of sets of two specific values must satisfy the following conditions: (1) one of two specific values in each set is added to produce sums of different combinations, wherein the sums of the different combinations are different from each other; and (2) a maximum sum obtained by adding the maximum specific value of two specific values in each set is less than a grayscale value resolution of the camera.

Therefore, using the method 300 that is illustrated in FIG. 3, the computing device can overlap the plurality of decimal illumination patterns to a grayscale illumination pattern, and the projector only needs to project the overlapped grayscale illumination pattern onto the object. The effect of reducing the number of illumination patterns projected by the projector may be achieved.

How the computing device converts the Gray code binary illumination patterns in each group to the decimal illumination patterns in step S310 will be described in detail below. In an example, it is assumed that the Gray code binary illumination patterns represent a 4-bit Gray code. As shown in FIG. 2B, the 4-bit Gray code can be divided into four Gray code binary illumination patterns 201, 202, 203, 204. It is assumed that the number of Gray code binary illumination patterns in each group overlapped by the computing device is two, and the number of sets of two specific values is two. In this example, the two sets of two specific values are designed to be (0 and 50) and (100 and 200). Specifically, the computing device replaces the binary values (0 and 1) of the two Gray code binary illumination patterns in each group with decimal values (0 and 50) and (100 and 200), respectively, as shown in Table 1.

TABLE 1

| | | |
|---|---|---|
| 1$^{st}$ Gray code binary illumination pattern | 0→0 | 1→50 |
| 2$^{nd}$ Gray code binary illumination pattern | 0→100 | 1→200 |

Figure 4:
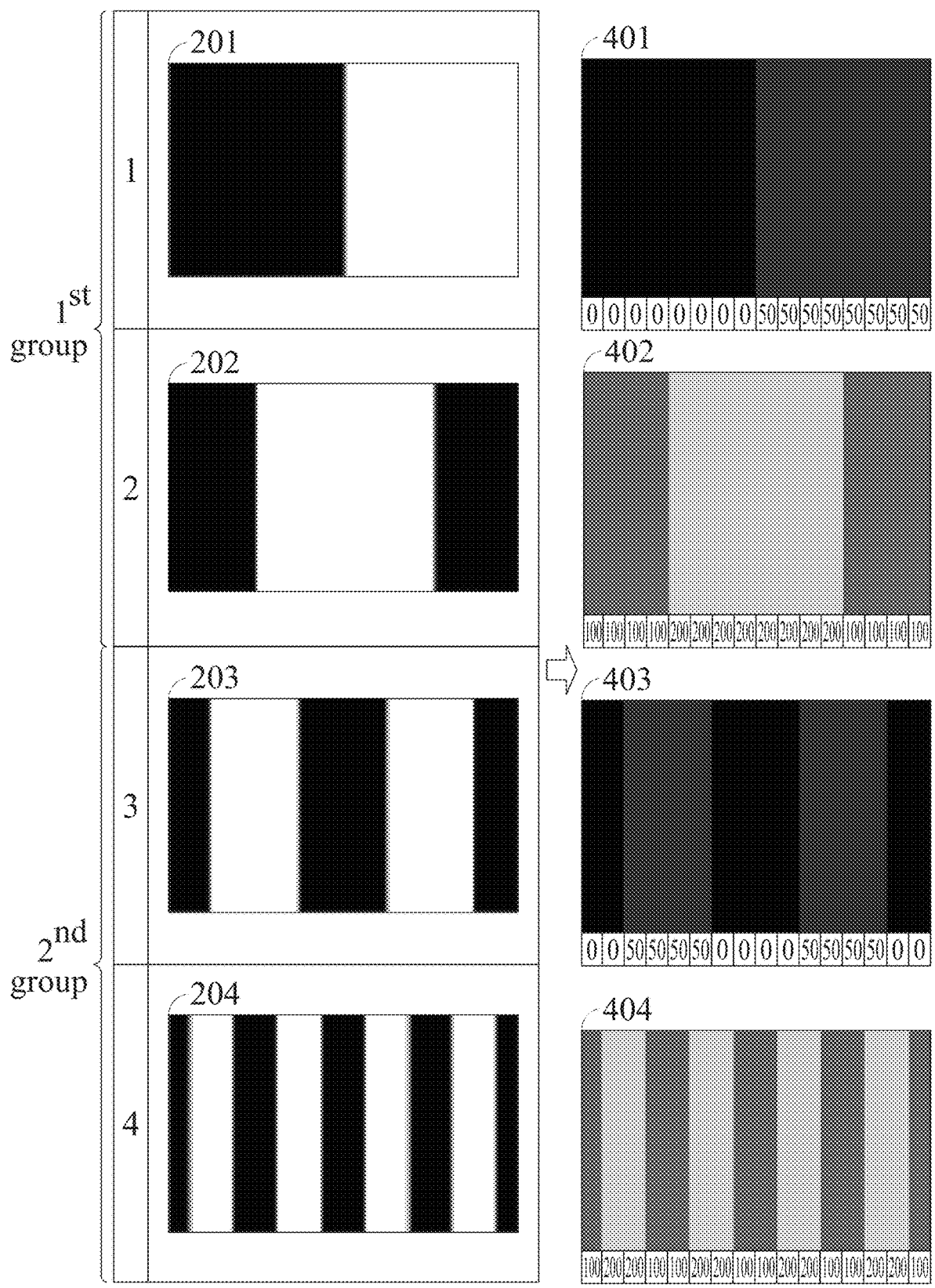
FIG. 4 is a schematic diagram illustrating the conversion of a Gray code binary illumination pattern into a decimal illumination pattern in accordance with an embodiment of the present disclosure.

It is assumed that the Gray code binary illumination patterns 201 and 202 belong to a first group, and the Gray code binary illumination patterns 203 and 204 belong to a second group. As shown in Table 1, the binary values (0 and 1) of the Gray code binary illumination pattern 201 can be replaced with the decimal values (0 and 50), and the binary values (0 and 1) of the Gray code binary illumination pattern 202 can be replaced with the decimal values (100 and 200). Similarly, in the second group, the binary values (0 and 1) of the Gray code binary illumination pattern 203 can be replaced with the decimal values (0 and 50), and the binary value of the Gray code binary illumination pattern 204 (0 and 1) can be replaced with the decimal values (100 and 200). Therefore, the decimal illumination patterns 401, 402, 403 and 404 corresponding to the specific values can be generated, as shown in FIG. 4. The values indicated below the decimal illumination patterns 401, 402, 403 and 404 are the decimal values converted by the computing device.

Figure 5A:
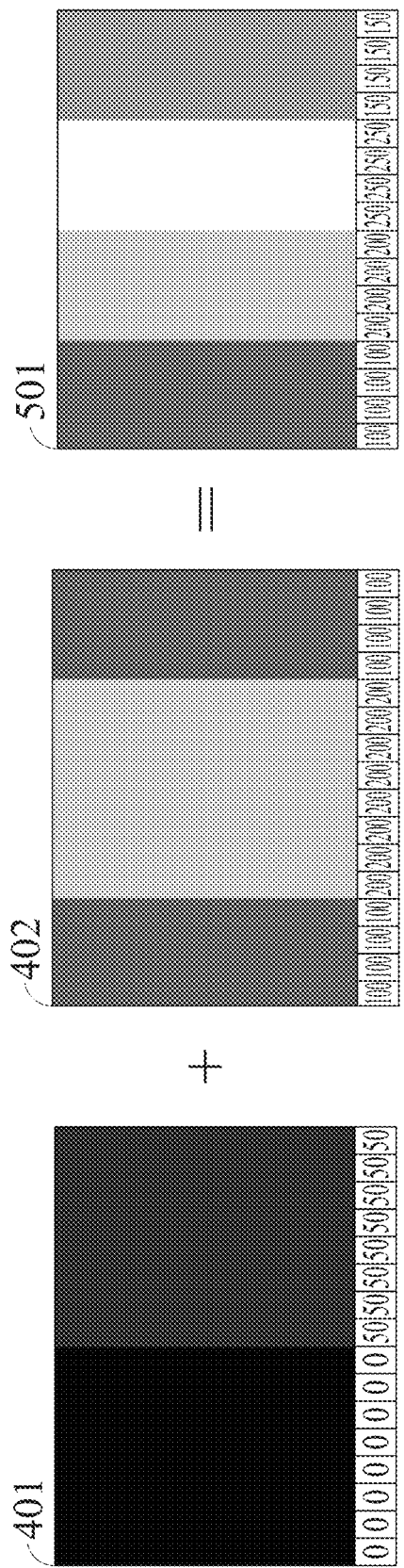
FIGS. 5A~5B are schematic diagrams showing that the computing device overlaps the decimal illumination patterns in each group to a grayscale illumination pattern according to an embodiment of the present disclosure.
Figure 5B:
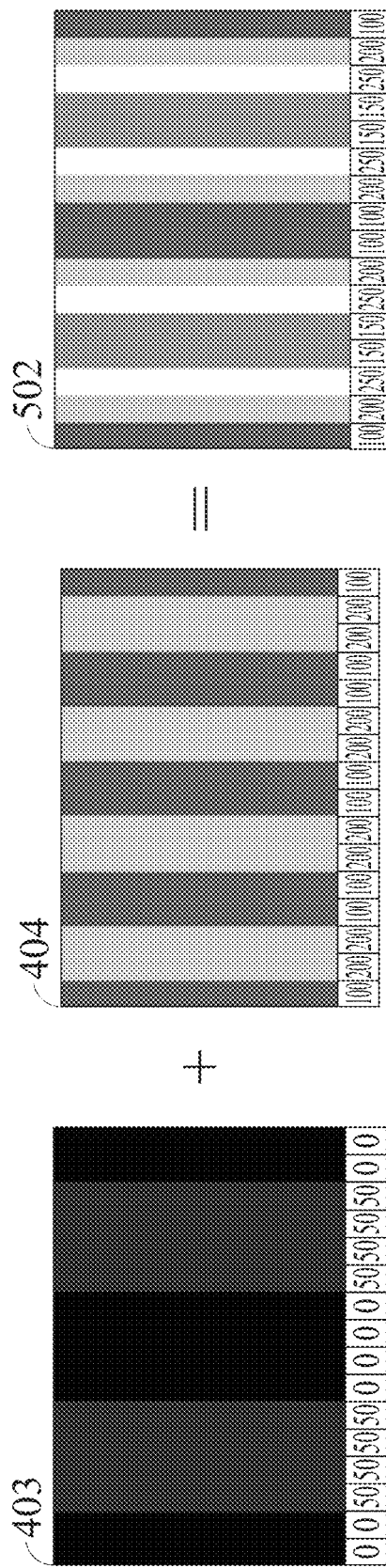

After the computing device generates the decimal illumination patterns, the computing device then overlays the decimal illumination patterns in each group to a grayscale illumination pattern. FIGS. 5A~5B are schematic diagrams showing that the computing device overlaps the decimal illumination patterns in each group to a grayscale illumination pattern according to an embodiment of the present disclosure with reference to FIG. 4. As shown in FIG. 5A, the computing device overlays the decimal illumination patterns 401 and 402 in the first group and produces a first grayscale illumination pattern 501. Similarly, as shown in FIG. 5B, the computing device overlays the decimal illumination patterns 403 and 404 in the second group and produces a second grayscale illumination pattern 502. The values indicated below the first grayscale illumination pattern 501 and the second grayscale illumination pattern 502 are the grayscale values, 100, 150, 200 and 250, after the computing device overlaps the decimal illumination patterns 401 and 402. Specifically, these grayscale values are sums of the different combinations produced by the computing device adding one of two specific values in each set. Obviously, the sums of the different combinations are different from each other. In addition, the maximum sum that the computing device adds the maximum specific value of two specific values in each set is 250. In order for the camera to recognize each value of the grayscale illumination pattern, the grayscale value resolution of the camera must be greater than 250. In this example, the camera can be an 8-bit camera with a depth range of 0 to $2^8-1$.

As another example, it is assumed that the Gray code binary illumination patterns represent a 9-bit Gray code. The first 3-bit Gray code can be divided into Gray code binary illumination patterns 201, 202, 203, as shown in FIG. 2B. It is assumed that the number of Gray code binary illumination patterns in each group overlapped by the computing device is three, and the number of sets of two specific values is three. In this example, the three sets of two specific values are designed to be (0 and 512), (64 and 1088), and (192 and 2240). Specifically, the computing device replaces the binary values (0 and 1) of the three Gray code binary illumination patterns in each group with the decimal values (0 and 512), (64 and 1088), and (192 and 2240), respectively, as shown in Table 2.

TABLE 2

| | | |
|---|---|---|
| 1st Gray code binary illumination pattern | 0→0 | 1→512 |
| 2nd Gray code binary illumination pattern | 0→64 | 1→1088 |
| 3rd Gray code binary illumination pattern | 0→192 | 1→2240 |

Figure 6:
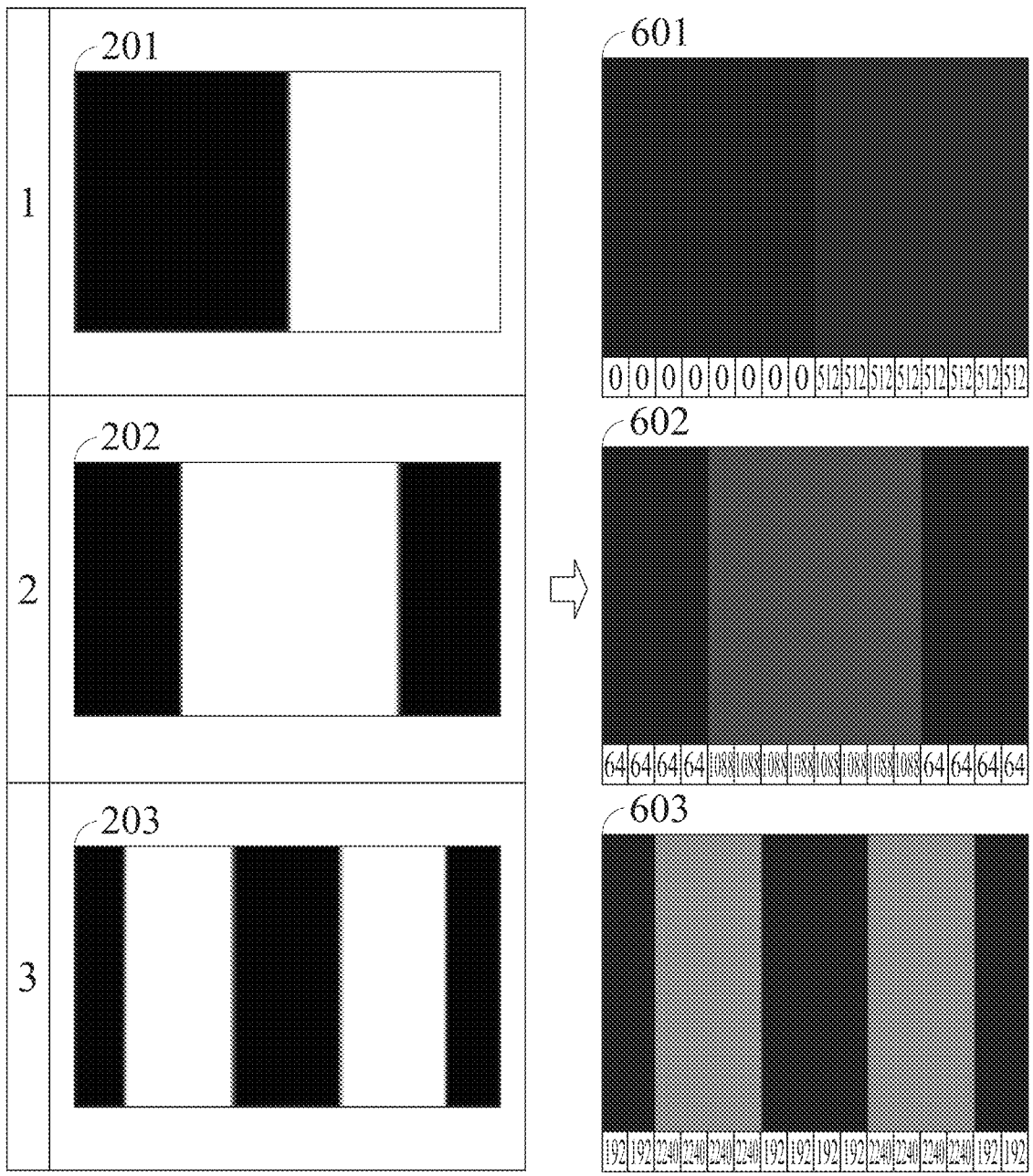
FIG. 6 is a schematic diagram illustrating the conversion of a Gray code binary illumination pattern into a decimal illumination pattern in accordance with an embodiment of the present disclosure.

It is assumed that the Gray code binary illumination patterns 201, 202 and 203 belong to a first group. As shown in Table 3, the binary values (0 and 1) of the Gray code binary illumination pattern 201 can be replaced with the decimal values (0 and 512), the binary values (0 and 1) of the Gray code binary illumination pattern 202 can be replaced with the decimal values (64 and 1088), and the binary values (0 and 1) of the Gray code binary illumination pattern 203 can be replaced with the decimal values (192 and 2240). Therefore, the decimal illumination patterns 601, 602 and 603 corresponding to the specific values can be generated, as shown in FIG. 6. The values indicated below the decimal illumination patterns 601, 602 and 603 are the decimal values converted by the computing device. It should be noted that only the decimal illumination patterns 601, 602 and 603 of the first group are shown in FIG. 6, and the decimal illumination patterns of the remaining groups can be derived according to the foregoing process, so details will be omitted.

Figure 7:
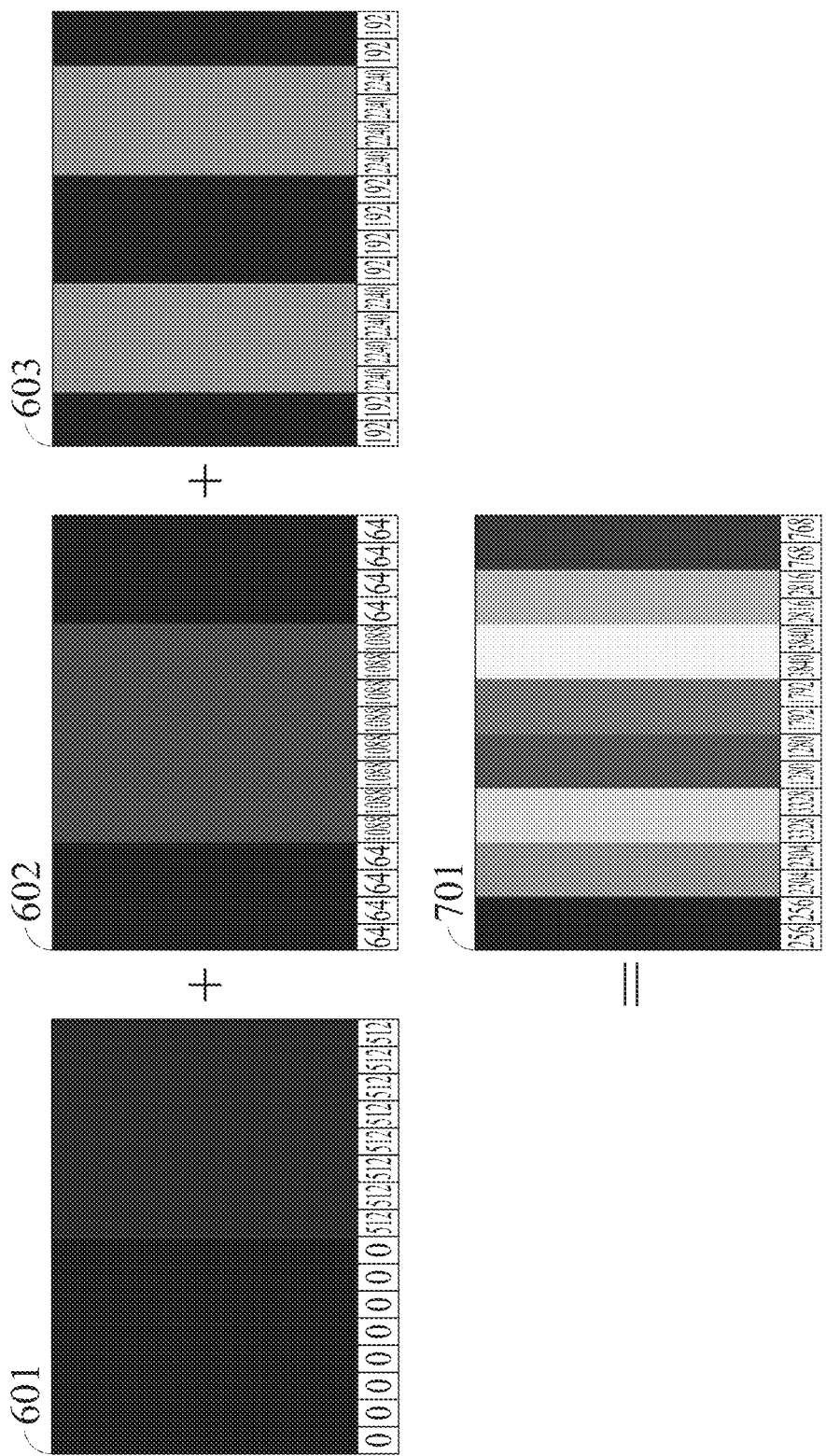
FIG. 7 is a schematic diagram showing that the computing device overlaps the decimal illumination patterns in each group to a grayscale illumination pattern according to an embodiment of the present disclosure.

After the computing device generates the decimal illumination patterns, the computing device then overlays the decimal illumination patterns in each group to a grayscale illumination pattern. FIG. 7 is a schematic diagram showing that the computing device overlaps the decimal illumination patterns in each group to a grayscale illumination pattern according to an embodiment of the present disclosure with reference to FIG. 6. As shown in FIG. 7, the computing device overlaps the decimal illumination patterns 601, 602, and 603 in the first group to generate a first grayscale illumination pattern 701, wherein the values indicated below the first grayscale illumination pattern 701 are the grayscale values, 256, 768, 1280, 1792, 2304, 2816, 3328 and 3840 after the computing device overlaps the decimal illumination patterns 601, 602 and 603. Specifically, these grayscale values are the sums of the different combinations produced by the computing device adding one of two specific values in each set. Obviously, the sums of the different combinations are different from each other. In addition, the maximum sum that the computing device adds the maximum specific value of two specific values in each set is 3840. In order for the camera to recognize each value of the grayscale illumination pattern, the grayscale value resolution of the camera must be greater than 3840. In this example, the camera can be a 12-bit camera with a depth range of 0 to $2^{12}-1$.

In one embodiment, since the surface material of each region of the object may be different, the reflection coefficient of each region of the object may also be different. Before the light projector projects a two-dimensional illumination pattern, the light projector may first project uniform light onto the object. Then, the surface brightness (or image grayscale value) is obtained by the camera photographing the object to derive the reflection coefficient of the surface material of each region of the object, wherein the reflection coefficient r(x, y) can be obtained by the following formula.

$$f(x,y)=i(x,y)r(x,y)$$

$$0<i(x,y)<\infty,\ 0<r(x,y)<1$$

wherein the uniform light i(x, y) is a constant, and f(x, y) is the surface brightness. The computing device can record the reflection coefficient r(x, y) in the memory. When the computing device subsequently reverts the Gray code associated with each image of the object, the computing device can use the surface brightness f(x, y) and the reflection coefficient r(x, y) to derive the original light source illumination $i_{original}(x, y)$ for reducing the probability of error caused by the computing device to revert the Gray code.

As shown above, the method and device for improving the efficiency of reconstructing a three-dimensional model in the present disclosure overlaps a plurality of Gray code binary images to a grayscale illumination pattern, so as to reduce the number of illumination patterns projected by the projector, and reduce the operation time without affecting the measurement accuracy.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the disclosure has been described by way of example and in terms of exemplary embodiment, it should be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method for improving the efficiency of reconstructing a three-dimensional model, comprising:
   dividing a series of different Gray code binary illumination patterns into a plurality of groups;
   converting binary values of Gray code binary illumination patterns in each group to a plurality of sets of two specific values to generate decimal illumination patterns corresponding to the specific values, wherein one of the two specific values in a first set of the plurality of sets is added to one of the two specific values in a second set of the plurality of sets to produce sums of different combinations, wherein the sums of the different combinations are different from each other;
   overlapping the decimal illumination patterns in each group to a grayscale illumination pattern;
   using a projector to project each grayscale illumination pattern onto an object from a projection direction;

using a camera to capture one or more object images of the object;
reverting the object images to non-overlapping Gray code binary images corresponding to the object images; and
reconstructing the depth of the object according to the non-overlapping Gray code binary images.

2. The method for improving the efficiency of reconstructing a three-dimensional model as claimed in claim 1, wherein the plurality of sets of two specific values satisfy the following condition:
a maximum sum obtained by adding the maximum specific value of two specific values in each set is less than a grayscale value resolution of the camera.

3. The method for improving the efficiency of reconstructing a three-dimensional model as claimed in claim 1, wherein the number of sets of two specific values is equal to the number of Gray code binary illumination patterns in each group.

4. The method for improving the efficiency of reconstructing a three-dimensional model as claimed in claim 1, wherein when the number of sets is two, the specific values of the sets are (0 and 50) and (100 and 200).

5. The method for improving the efficiency of reconstructing a three-dimensional model as claimed in claim 1, wherein when the number of sets is three, the specific values of the sets are (0 and 512), (64 and 1088) and (192 and 2240).

6. A device for improving the efficiency of reconstructing a three-dimensional model, comprising:
a processor; and
a memory, operatively coupled to the processor;
wherein the processor is configured to execute a program code stored in the memory to:
divide a series of different Gray code binary illumination patterns into a plurality of groups;
convert binary values of Gray code binary illumination patterns in each group to a plurality of sets of two specific values to generate decimal illumination patterns corresponding to the specific values, wherein one of the two specific values in a first set of the plurality of sets is added to one of the two specific values in a second set of the plurality of sets to produce sums of different combinations, wherein the sums of the different combinations are different from each other;
overlap the decimal illumination patterns in each group to a grayscale illumination pattern;
use a projector to project each grayscale illumination pattern onto an object from a projection direction;
use a camera to capture one or more object images of the object;
revert the object images to non-overlapping Gray code binary images corresponding to the object images; and
reconstruct the depth of the object according to the non-overlapping Gray code binary images.

7. The device for improving the efficiency of reconstructing a three-dimensional model as claimed in claim 6, wherein the plurality of sets of two specific values satisfy the following condition:
a maximum sum obtained by adding the maximum specific value of two specific values in each set is less than a grayscale value resolution of the camera.

8. The device for improving the efficiency of reconstructing a three-dimensional model as claimed in claim 6, wherein the number of sets of two specific values is equal to the number of Gray code binary illumination patterns in each group.

9. The device for improving the efficiency of reconstructing a three-dimensional model as claimed in claim 6, wherein when the number of sets is two, the specific values of the sets are (0 and 50) and (100 and 200).

10. The device for improving the efficiency of reconstructing a three-dimensional model as claimed in claim 6, wherein when the number of sets is three, the specific values of the sets are (0 and 512), (64 and 1088) and (192 and 2240).

* * * * *